(12) United States Patent
Furuno et al.

(10) Patent No.: US 7,630,593 B2
(45) Date of Patent: Dec. 8, 2009

(54) OPTICAL WAVEGUIDE MEMBER, OPTICAL WAVEGUIDE ASSEMBLY, AND OPTICAL MODULE

(75) Inventors: Yasuhiko Furuno, Shinagawa (JP); Osamu Daikuhara, Shinagawa (JP); Toshihiro Kusagaya, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 11/704,255

(22) Filed: Feb. 9, 2007

(65) Prior Publication Data

US 2007/0183709 A1    Aug. 9, 2007

(30) Foreign Application Priority Data

Feb. 9, 2006    (JP)   ............................. 2006-032630
Mar. 29, 2006    (JP)   ............................. 2006-090419

(51) Int. Cl.
     *G02B 6/12*      (2006.01)
     *G02B 6/36*      (2006.01)

(52) U.S. Cl. .............................. 385/14; 385/70; 385/89; 385/93

(58) Field of Classification Search .................. 385/14, 385/55, 70–75, 88, 89, 92, 93
See application file for complete search history.

(56) References Cited

U.S. PATENT DOCUMENTS

| | | | | |
|---|---|---|---|---|
| 5,853,626 A | * | 12/1998 | Kato | .......................... 264/1.25 |
| 6,048,107 A | * | 4/2000 | Pubanz | .......................... 385/92 |
| 6,813,418 B1 | * | 11/2004 | Kragl | ............................ 385/49 |
| 6,821,027 B2 | * | 11/2004 | Lee et al. | ........................ 385/89 |
| 6,901,185 B2 | * | 5/2005 | Sasaki et al. | ................... 385/33 |
| 7,108,432 B2 | * | 9/2006 | Nagasaka | ...................... 385/89 |
| 7,118,293 B2 | * | 10/2006 | Nagasaka et al. | .............. 385/89 |
| 7,189,007 B2 | * | 3/2007 | Imanbayev et al. | ........... 385/78 |
| 7,234,874 B2 | * | 6/2007 | Morse et al. | ................... 385/53 |
| 7,287,914 B2 | * | 10/2007 | Fujiwara et al. | ................ 385/88 |
| 2003/0174964 A1 | * | 9/2003 | Gao et al. | ....................... 385/49 |
| 2004/0202477 A1 | * | 10/2004 | Nagasaka et al. | ............ 398/138 |

FOREIGN PATENT DOCUMENTS

| | | |
|---|---|---|
| JP | 2000-69222 | 3/2000 |
| JP | 2005-115346 | 4/2005 |

* cited by examiner

*Primary Examiner*—Daniel Petkovsek
(74) *Attorney, Agent, or Firm*—Staas & Halsey LLP

(57) ABSTRACT

An optical waveguide member including a first cladding section, a second cladding section joined to the first cladding section, and core sections formed between the first and second cladding sections. The first cladding section includes a major portion including a first surface and an opposite second surface, and an auxiliary portion formed along one side edge and including a reflecting surface. The core sections includes a first set of core sections formed along a plurality of grooves provided on the first surface of the first cladding section, and a second set of core sections formed along a plurality of grooves provided on the second surface of the first cladding section. Both of light propagating through the first set of core sections and light propagating through the second set of core sections are reflected at right angle by the reflecting surface and propagate through the auxiliary portion of the first cladding section.

18 Claims, 11 Drawing Sheets

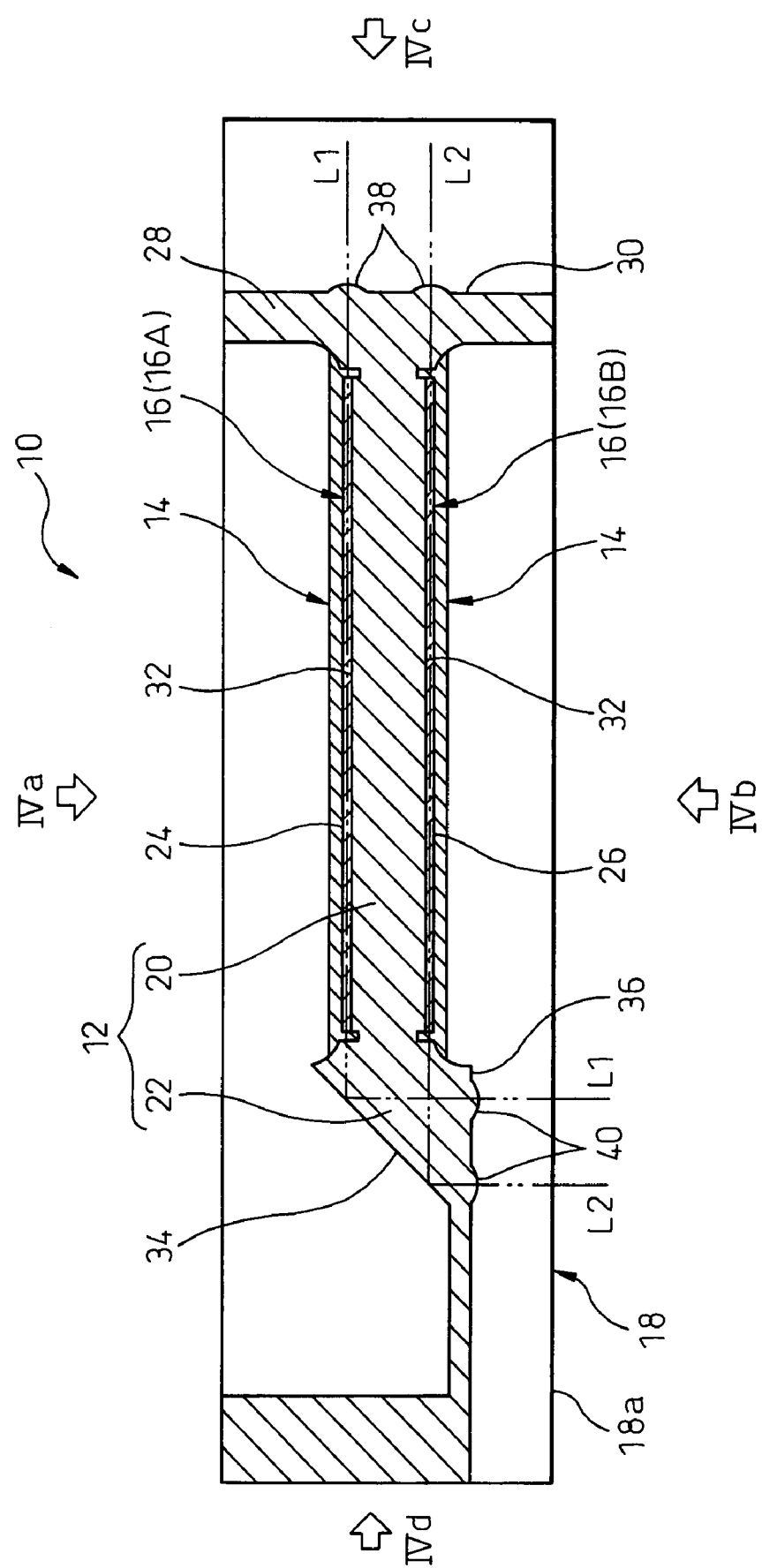

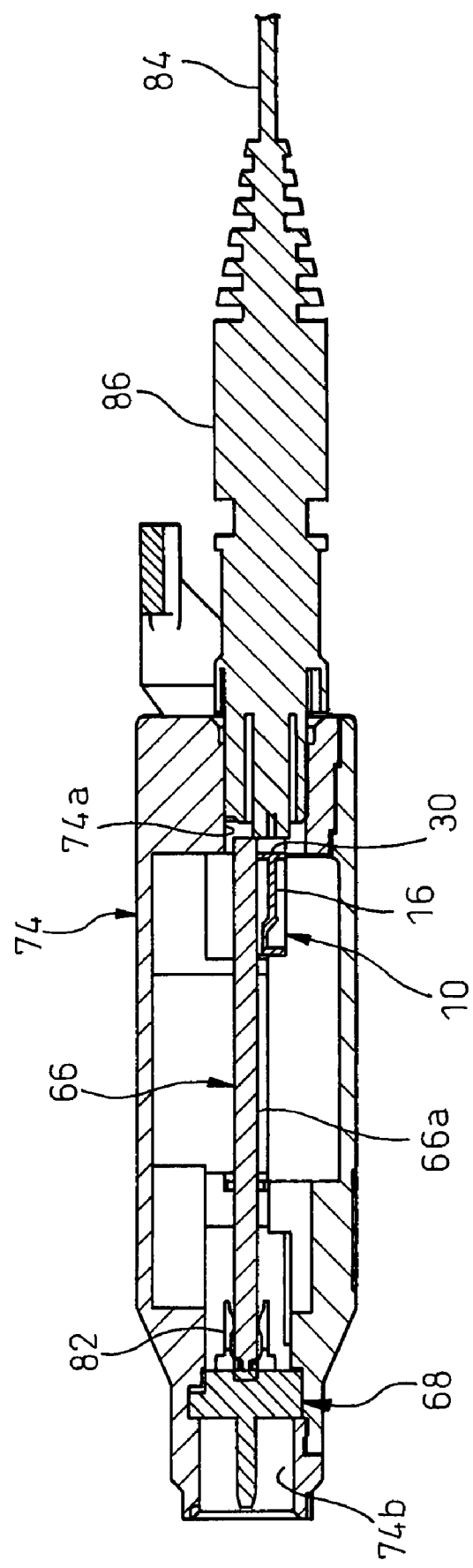

OPTICAL WAVEGUIDE MEMBER, OPTICAL WAVEGUIDE ASSEMBLY, AND OPTICAL MODULE

BACKGROUND OF THE INVENTION

1. Field of the Invention

The present invention relates to an optical waveguide member. The present invention also relates to an optical waveguide assembly including an optical waveguide member. The present invention further relates to an optical module including an optical waveguide member.

2. Description of the Related Art

An optical waveguide member is conventionally known, in the field of optical signal transmission technology, as a light propagating element capable of providing additional functions such as an optical switch, an optical coupler, etc. In recent years, so-called polymer optical waveguide prepared from polymer materials has been developed. A conventional polymer optical waveguide comprises a first cladding section of resin material formed by molding the resin material into plate-like shape with a groove provided on the surface, a core section formed by filling the groove on the first cladding section with another resin material, and a second cladding section formed by laminating a resin coating on the surface of the first cladding section so as to cover the core section. As a polymer optical waveguide member permits a plurality of grooves to be easily formed on the surface of the first cladding section by molding, it allows development of a multi-channel structure having two or more core sections. Further, it has various other advantages. For example, a collective lens surface as a light incident/output end face or a reflecting surface for converting the propagating direction of light propagating through the core section can be formed easily at a desired location on the external surface of the first cladding section (see, e.g., Japanese Unexamined Patent Publication (Kokai) No. 2000-69222 (JP-A-2000-69222)).

On the other hand, a photoelectric conversion module (referred to simply as an optical module) for a mutual conversion of an electric signal and an optical signal, which comprises a circuit board with an photoelectric conversion element (referred simply to as an optical element) mounted on one surface thereof (referred to as a mounting surface), and an optical waveguide member provided on the mounting surface of the circuit board for guiding the light participating in a photoelectric converting action (i.e., a light emitting action or a light receiving action) in the direction parallel to the mounting surface, has been conventionally known (see, e.g., Japanese Unexamined Patent Publication (Kokai) No. 2005-115346 (JP-A-2005-115346)). The optical module of this type can use the optical waveguide member for propagating light acting upon (i.e., emitted or received by) the optical element mounted on the circuit board in a direction perpendicular to the mounting surface, in a direction parallel to the mounting surface, and can form a detachable optical connection to, for example, an optical connector attached to an external optical cable. Therefore, it has the advantage that dimension of a module case in height direction (i.e., a direction perpendicular to the mounting surface of the circuit board) can be effectively reduced. Also, in the optical module of this type, it is relatively easy to establish a multi-channel photoelectric conversion system using the above-described polymer optical waveguide member.

In the above-described polymer optical waveguide member, the dimension of the first cladding section increases in the direction along the surface forming the core section as the number of the core sections (i.e., the number of channels) increases, so that it is difficult to fabricate a multi-channel optical waveguide member having more than 10 channels, under the predetermined dimensional constraint. In this respect, as the configuration described in JP-A-2000-69222 relates only to one dimensional image sensor, an increase in the dimensions of the cladding section due to the increase of the number of channels is acceptable. However, in the optical module used in the general optical transmission system as described in JP-A-2005-115346, it is required to increase the number of channels so as to exceed ten while restraining a dimensional increase of the optical waveguide member.

SUMMARY OF THE INVENTION

It is an object of the present invention to provide an optical waveguide member capable of establishing a multi-channel structure while restraining an increase in the dimensions of a cladding section.

It is another object of the present invention to provide an optical waveguide assembly including an optical waveguide member, which is capable of establishing a multi-channel structure while restraining an increase in the overall dimensions.

It is still another object of the present invention to provide an optical module including an optical waveguide member, which is capable of establishing a multi-channel structure while restraining an increase in the overall dimensions.

To accomplish the above object, the present invention provides an optical waveguide member comprising a first cladding section; a second cladding section joined to the first cladding section; and a plurality of core sections formed between the first cladding section and the second cladding section; the first cladding section comprising a major portion including a first surface, a second surface opposite to the first surface, a first end face extending in a direction perpendicular to both of the first surface and the second surface, and a plurality of grooves provided respectively on the first surface and the second surface to extend in a direction perpendicular to the first end face; and an auxiliary portion integrally connected to the major portion at a side opposite to the first end face, the auxiliary portion including a reflecting surface extending in a direction obliquely intersecting both of the first surface and the second surface of the major portion, and a second end face extending in a direction obliquely intersecting the reflecting surface and perpendicular to the first end face of the major portion; the plurality of core sections comprising a first set of core sections formed along the plurality of grooves provided on the first surface of the major portion of the first cladding section; and a second set of core sections formed along the plurality of grooves provided on the second surface of the major portion of the first cladding section; the second cladding section being configured to cover the first set of core sections and the second set of core sections formed respectively on the first surface and the second surface of the major portion of the first cladding section, and to be joined to the first and second surface; wherein light propagating through the first set of core sections formed on the first surface of the major portion of the first cladding section and light propagating through the second set of core sections formed on the second surface of the major portion of the first cladding section are reflected by the reflecting surface and propagate through the auxiliary portion of the first cladding section.

In the above optical waveguide member, a plurality of lens surfaces may be formed on the first end face of the major portion of the first cladding section, the lens surfaces being disposed at positions where the light propagating through the first set of core sections formed on the first surface and the light propagating through the second set of core sections formed on the second surface are individually transmitted the lens surfaces.

Also, a plurality of lens surfaces may be formed on the second end face of the auxiliary portion of the first cladding section, the lens surfaces being disposed at positions where the light propagating through the first set of core sections formed on the first surface and reflected by the reflecting surface and the light propagating through the second set of core sections formed on the second surface and reflected by the reflecting surface are individually transmitted through the lens surfaces.

The first set of core sections formed on the first surface of the major portion of the first cladding section and the second set of core sections formed on the second surface of the major portion of the first cladding section may be disposed at positions enabling the light propagating through the first set of core sections to cross the light propagating through the second set of core sections and thus to propagate through the auxiliary portion of the first cladding section.

Each of the plurality of grooves provided on the first and second surfaces of the major portion of the first cladding section may be provided, at a longitudinal end thereof facing to the reflecting surface of the auxiliary portion, with a curved end face arcuately bulging toward the reflecting surface; and a core end face acting as a convex lens relative to light propagating through each of the plurality of core sections may be formed along the curved end face at a longitudinal end of each core section.

The present invention also provides an optical waveguide assembly comprising a plurality of optical waveguide members, each optical waveguide member being one as set forth above; wherein the optical waveguide members are assembled together in a stacked form with the first surface of the major portion of one optical waveguide member facing to the second surface of the major portion of another optical waveguide member.

The present invention further provides an optical module comprising a circuit board having a mounting surface with a plurality of optical elements mounted thereon; and an optical waveguide member provided on the mounting surface of the circuit board and configured to direct light in a direction parallel to the mounting surface, the light participating in a photoelectric converting action of each of the plurality of optical elements; wherein the optical waveguide member is one as set forth above; and wherein the second end face of the auxiliary portion of the first cladding section is disposed proximately to and faces toward the plurality of optical elements mounted on the circuit board.

In the above optical module, the plurality of optical elements may comprise a plurality of light emitting elements and a plurality of light receiving elements; the first set of core sections formed on the first surface of the major portion of the first cladding section of the optical waveguide member may propagate light emitted respectively by the plurality of light emitting elements; and the second set of core sections formed on the second surface of the major portion of the first cladding section of the optical waveguide member may propagate light received respectively by the plurality of light receiving elements.

The optical waveguide member may further comprise a pedestal section creating a gap, for accommodating the optical elements and driving elements for the optical elements, between the second surface of the major portion of the first cladding section and the mounting surface of the circuit board.

The above optical module may further comprise an electrical connector mounted on the circuit board and connected to the plurality of optical elements on the circuit board.

Also, the above optical module may further comprise a plurality of terminals provided along a peripheral edge of the circuit board and individually connected to the plurality of optical elements on the circuit board.

In the above optical module, the optical waveguide member may be connected to an optical connector provided with a plurality of optical fibers, the plurality of optical fibers of the optical connector being individually optically connected to the plurality of core sections.

The present invention further provides an optical waveguide member comprising a cladding section; and a plurality of core sections formed in the cladding section; the cladding section comprising a major portion including a plurality of first grooves arranged in a first array and a plurality of second grooves arranged in a second array and spaced in parallel from the first array; and an auxiliary portion formed adjacent to the major portion, and including a reflecting surface extending in a direction obliquely intersecting an extending direction of the plurality of first and second grooves of the major portion; the plurality of core sections comprising a first set of core sections formed in the plurality of first grooves of the major portion of the cladding section; and a second set of core sections formed in the plurality of second grooves of the major portion of the cladding section; wherein light propagating through the first set of core sections and light propagating through the second set of core sections are reflected by the reflecting surface and propagate through the auxiliary portion of the cladding section.

In the above optical waveguide member, the major portion of the cladding section may be provided, at a side opposite to the auxiliary portion, with a first end face extending in a direction intersecting the extending direction of the plurality of first and the second grooves; and a plurality of lens surfaces may be formed on the first end face to individually transmit light propagating through the first set of core sections and light propagating through the second set of core sections.

Also, the auxiliary portion of the cladding section may be provided, at a side opposite to the major portion, with a second end face extending in a direction obliquely intersecting the reflecting surface; and a plurality of lens surfaces may be formed on the second end face to individually transmit light propagating through the first set of core sections and light propagating through the second set of core sections.

Also, each of the plurality of first and second grooves of the major portion of the cladding section may be provided, at a longitudinal end thereof facing to the reflecting surface of the auxiliary portion, with a curved end face arcuately bulging toward the reflecting surface; and a core end face acting as a convex lens relative to light propagating through each of the plurality of core sections may be formed along the curved end face at a longitudinal end of each core section.

BRIEF DESCRIPTION OF THE DRAWINGS

The above and other objects, features and advantages of the present invention will become more apparent from the following description of preferred embodiments in connection with the accompanying drawings, wherein:

FIG. 3 is a vertical sectional view of the optical waveguide member of FIG. 1, taken along the line III-III of FIG. 1;

FIG. 8 is a vertical sectional view showing the optical module of FIG. 7A;

DESCRIPTION OF THE PREFERRED EMBODIMENT

Figure 1:
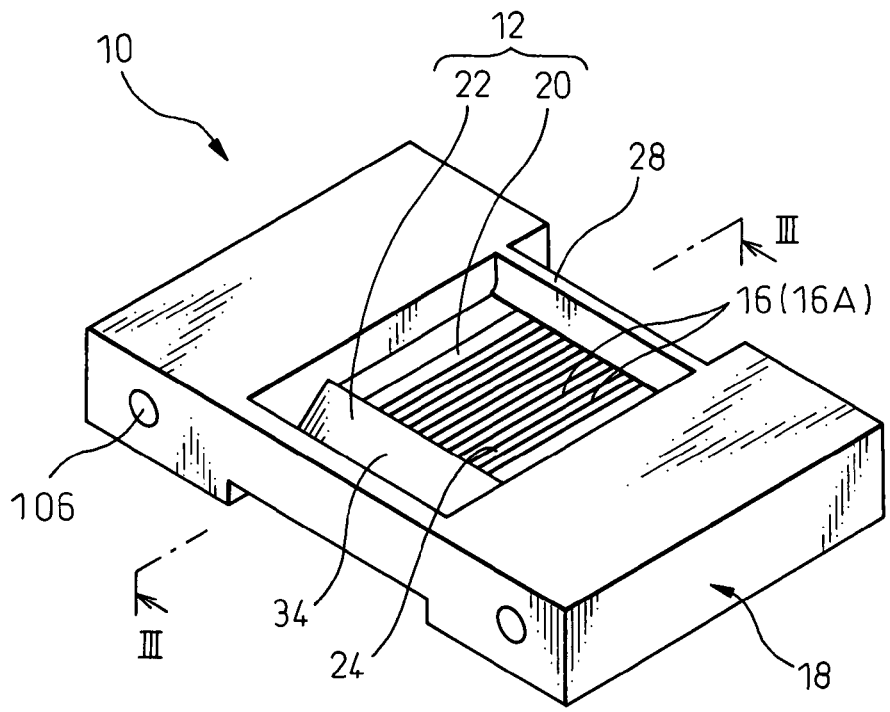
FIG. 1 is a perspective view showing an optical waveguide member according to a first embodiment of the present invention.

The embodiments of the present invention are described below in detail, with reference to the accompanying drawings. In the drawings, the same or similar components are denoted by common reference numerals.

Figure 2:
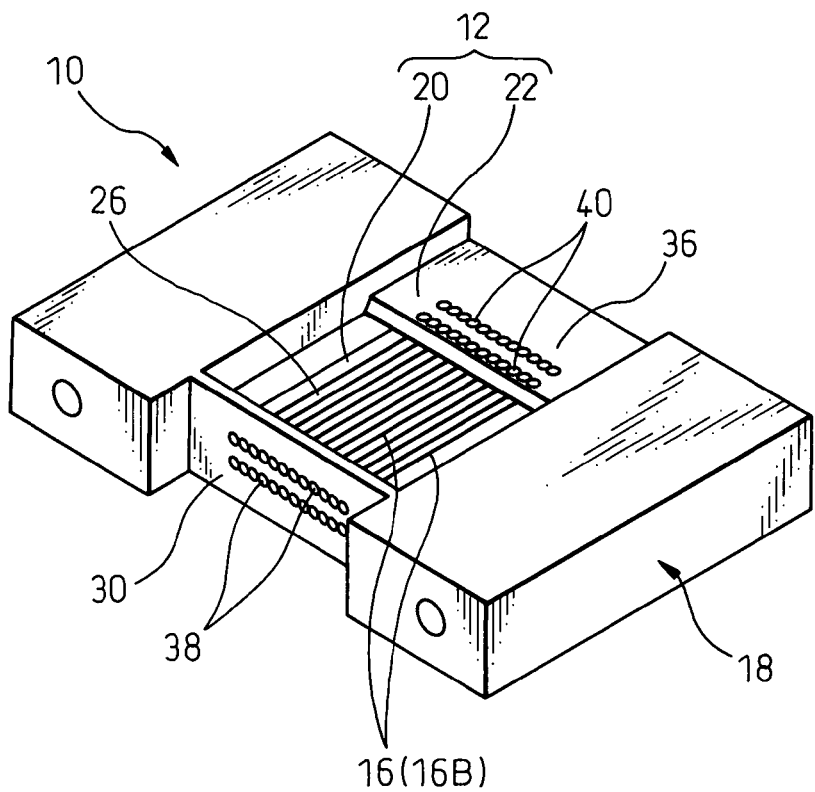
FIG. 2 is a perspective view showing the optical waveguide member of FIG. 1 as seen from a direction different from that in FIG. 1.

Referring to the drawings, FIG. 1 is a perspective view showing an optical waveguide member 10 according to a first embodiment of the present invention, FIG. 2 is a perspective view showing the optical waveguide member 10 as seen from different direction from that in FIG. 1, FIG. 3 is a sectional view showing the optical waveguide member 10, and FIGS. 4A to 4D are 4-sides views of the optical waveguide member 10.

The optical waveguide member 10 includes a first cladding section 12, a second cladding section 14 joined to the first cladding section 12, and a plurality of core sections 16 formed between the first cladding section 12 and the second cladding section 14 (FIG. 3). The optical waveguide member 10 further includes a pedestal section 18 which substantially surrounds and fixedly supports a waveguide structural region including the first cladding section 12, the second cladding section 14 and the core sections 16 (FIGS. 1 and 2). The first cladding section 12 and the pedestal section 18 are preferably molded into a single unitary member by a die molding process as described later, but can also be molded as separate parts which can be connected to each other in a subsequent process.

The first cladding section 12 includes a flat plate-shaped major portion 20 and a prism-shaped auxiliary portion 22 formed along one side edge of the major portion 20. The major portion 20 and the auxiliary portion 22 are formed into a single unitary member by a die molding process described later. The major portion 20 of the first cladding section 12 includes a first surface 24 and a second surface 26 opposite to the first surface 24, in the plate-shaped principal region thereof. The major portion 20 further includes a projecting wall 28 extending in a vertical direction along another side edge opposite to the side edge having the auxiliary portion formed, and a first end face 30 extending, outside of the projecting wall 28, in a direction perpendicular to both of the first and second surfaces 24, 26. On each of the first and second surfaces 24, 26, a plurality (twelve, in the drawing) of grooves 32 extending in the direction perpendicular to the first end face 30 are provided (FIG. 3) in parallel to each other and at regular intervals.

The auxiliary portion 22 of the first cladding section 12 includes a reflecting surface 34 positioned at a side opposite to the first end face 30 of the major portion 20 and extending in a direction obliquely intersecting both of the first and second surfaces 24, 26, and a second end face 36 obliquely intersecting the reflecting surface 34 and extending in a direction perpendicular to the first end face 30 of the major portion 20. The reflecting surface 34 is oriented so as to make an obtuse angle (135°) to the first surface 24 of the major portion 20, and to make an acute angle (45°) to the second surface 26. The second end face 36 is disposed at a position facing to the reflecting surface 34 at an acute angle (45°).

Figure 4A:
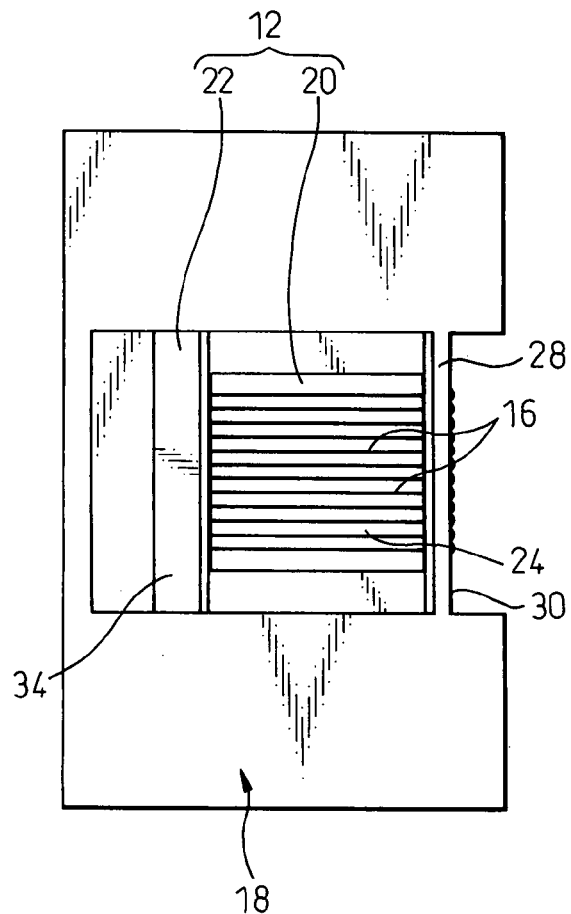
FIG. 4A is a plan view of the optical waveguide member of FIG. 1, as seen from the arrow IVa of FIG. 3.
Figure 4B:
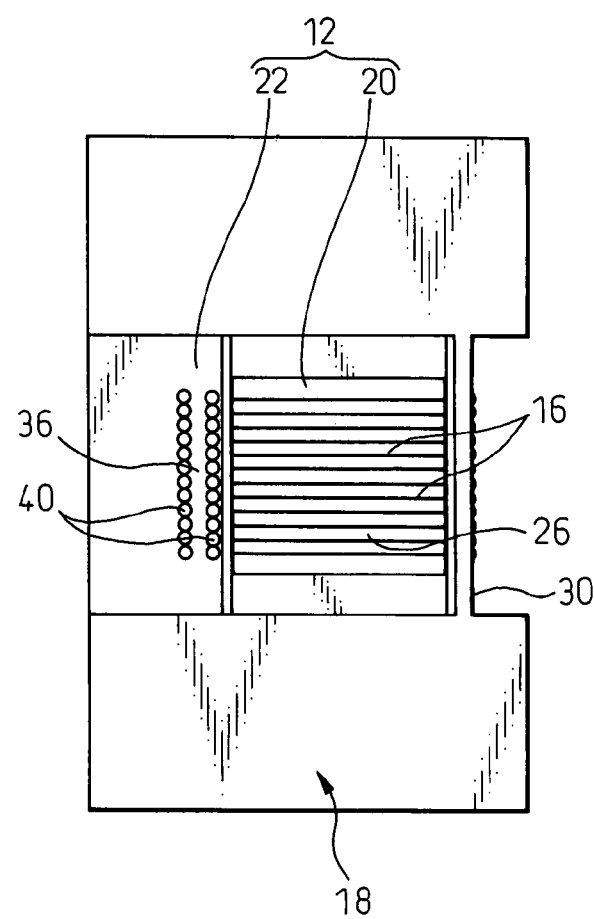
FIG. 4B is a plan view of the optical waveguide member of FIG. 1, as seen from the arrow IVb of FIG. 3.

The several core sections 16 include a first set of core sections 16A formed along the several grooves 32 provided on the first surface 24 of the major portion 20 of the first cladding section 12, and a second set of core sections 16B formed along the several grooves 32 provided on the second surface 26 of the major portion 20 of the first cladding section 12. All of the core sections 16 (16A, 16B) are linear elements extending in straight lines, and are accommodated individually and tightly in the respective grooves 32 of the first cladding section 12. When the first and second surfaces 24, 26 of the first cladding section 12 are viewed in a plan view, all of the first and second sets of core sections 16A, 16B extend in straight lines in a direction perpendicular to the first end face 30 of the first cladding section 12 and to the reflecting surface 34 (FIGS. 4A, 4B).

The second cladding section 14 covers the first set of core sections 16A and the second set of core sections 16B formed respectively on the first surface 24 and the second surface 26 of the major portion 20 of the first cladding section 12, and is joined to the first and the second surfaces 24, 26, respectively. Thereby, each of the core sections 16A, 16B functions as an optical waveguide for propagating light along the extending direction of the core section. The second cladding section 14 is a substantially transparent or translucent sheet-like element, and is not shown in FIGS. 1, 2, 4A and 4B.

The optical waveguide member 10 is configured such that the light L1 propagating through the first set of core sections 16A formed on the first surface 24 of the major portion 20 of the first cladding section 12 and the light L2 propagating through the second set of core sections 16B formed on the second surface 26 of the major portion 20 of the first cladding section 12 are both reflected at a right angle by the reflecting surface 34 of the auxiliary portion 22 of the first cladding section 12, and thereby propagate through the auxiliary portion 22 (shown by chain double-dashed lines in FIG. 3). In this arrangement, the propagation direction of the light L1, L2 may be optionally selected. For example, the light L1 and the light L2 are not necessarily propagating in the same direction, but may be propagating in directions opposite to each other. Thus, each of the first end face 30 of the major portion 20 and the second end face 36 of the auxiliary portion 22 in the first cladding section 12 acts as an incident surface or an output surface for the light L1 or the light L2 with respect to the first cladding section 12.

In the optical waveguide member 10 having the above-described configuration, as the first and second set of core sections 16A, 16B are respectively formed on the opposite surfaces (the first and second surfaces 24, 26) of the major portion 20 of the first cladding section 12, it is possible to effectively suppress an increase in the dimension in the direction along the first and the second surfaces 24, 26 of the first cladding section 12, as compared to the increase of the number of core sections (i.e., the number of channels). Therefore, under a predetermined dimensional constraint, the optical waveguide member 10 having a multi-channel structure having more than 10 channels (24 channels in the shown example) can be easily fabricated. If such an optical waveguide member 10 is used in an optical module in a general light transmission (or a photoelectric conversion) system, it is possible to establish a multi-channel structure having more than 10 channels of the module while suppressing an increase in the dimensions of a module case.

The optical waveguide member 10 can be fabricated from a polymer material by a die molding process. In this arrangement, first, the first cladding section 12 and the pedestal section 18 are formed in a die from a desired resin material into a predetermined form, and at the same time, a plurality of grooves 32 are formed in a required linear pattern at the predetermined positions on the first and second surfaces 24, 26 of the major portion 20 of the first cladding section 12. On the first cladding section 12 thus formed, each of a plurality of grooves 32 is filled thoroughly with a resin material (preferably, a thermosetting or photo-curing resin) of the core section 16, which is different from the resin material of the first cladding section 12. In a separate process, the second cladding sections 14 are molded in the form of two sheets from the same resin material as that of the first cladding section 12. Then, the second cladding sections 14 are laminated and joined to the first and second surface 24, 26 of the first cladding section 12, so as to cover the core sections 16 as a whole. When the core sections 16 are hardened completely in this state, the optical waveguide member 10 has been fabricated.

By such a die molding process, the optical waveguide member 10 can easily establish the multi-channel structure having the large number of core sections 16, and it is relatively easy to mold the reflecting surface 34 at a desired position on the external surface of the auxiliary portion 22 of the first cladding section 12 with high precision. Further, as shown in FIGS. 2 to 4D, it is also relatively easy to prepare collective convex lens surfaces 38, 40, on the first end face 30 of the major portion 20 and the second end face 36 of the auxiliary portion 22 in the first cladding section 12, as light incident/output end faces of the first cladding section 12 for the respective core sections 16. Thus, it is not necessary to prepare a separate lens, and the configuration of a light transmission (or photoelectric conversion) system including the optical waveguide member 10 can be simplified.

The plurality of lens surfaces 38 formed on the first end face 30 of the first cladding section 12 are disposed in two arrays at positions where the light L1 propagating through the first set of core sections 16A formed on the first surface 24 and the light L2 propagating through the second set of core sections 16B formed on the second surface 26 propagate through the projecting wall 28 in straight lines and are individually transmitted the lens surfaces 38. Similarly, the plurality of lens surfaces 40 formed on the second end face 36 of the first cladding section 12 are disposed in two arrays at positions where the light L1 propagating through the first set of core sections 16A formed on the first surface 24 and reflected by the reflecting surface 34 and the light L2 propagating through the second set of core sections 16B formed on the second surface 26 and reflected by the reflecting surface 34 propagate through the auxiliary portion 22 and are individually transmitted the lens surfaces 40. The collective lens surfaces 38, 40 can be formed at least on one of the first end face 30 and the second end face 36 of the first cladding section 12, depending upon the application of the optical waveguide member 10.

Figure 4C:
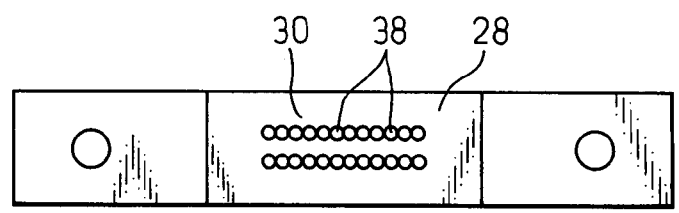
FIG. 4C is a side view of the optical waveguide member of FIG. 1, as seen from the arrow IVc of FIG. 3.
Figure 4D:
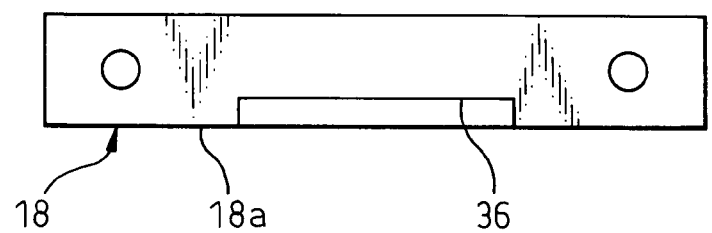
FIG. 4D is a side view of the optical waveguide member of FIG. 1, as seen from the arrow IVd of FIG. 3.

In the embodiment shown, the first set of core sections 16A formed on the first surface 24 of the major portion 20 of the first cladding section 12 and the second set of core sections 16B formed on the second surface 26 of the major portion 20 of the first cladding section 12 are disposed at positions enabling the light L1 propagating through each of the first set of core sections 16A to cross the light L2 propagating through each of the second set of core sections 16B in the auxiliary portion 22 of the first cladding section 12 and thus to propagate through the auxiliary portion 22 (FIG. 3). In other words, the first set of core sections 16A and the second set of core sections 16B are formed at positions in alignment with each other as seen in the direction of plate thickness of the major portion 20 of the first cladding section 12 (i.e., in the direction perpendicular to the first and second surfaces 24, 26). In this arrangement, the plurality of lens surfaces 38, 40 formed respectively on the first and second end faces 30, 36 of the first cladding section 12 are disposed in the form of a two-row multi-column matrix (FIGS. 4B and 4C).

In accordance with this configuration, an existing optical connector capable of collectively connecting two multi-core flat optical cables (as described later) can be connected to the optical waveguide member 10. Therefore, a light transmission (or photoelectric conversion) system can be configured with an optical module (as described later) including the optical waveguide member 10 using an existing connector, so as to obtain an advantageous cost effect.

Figure 5:
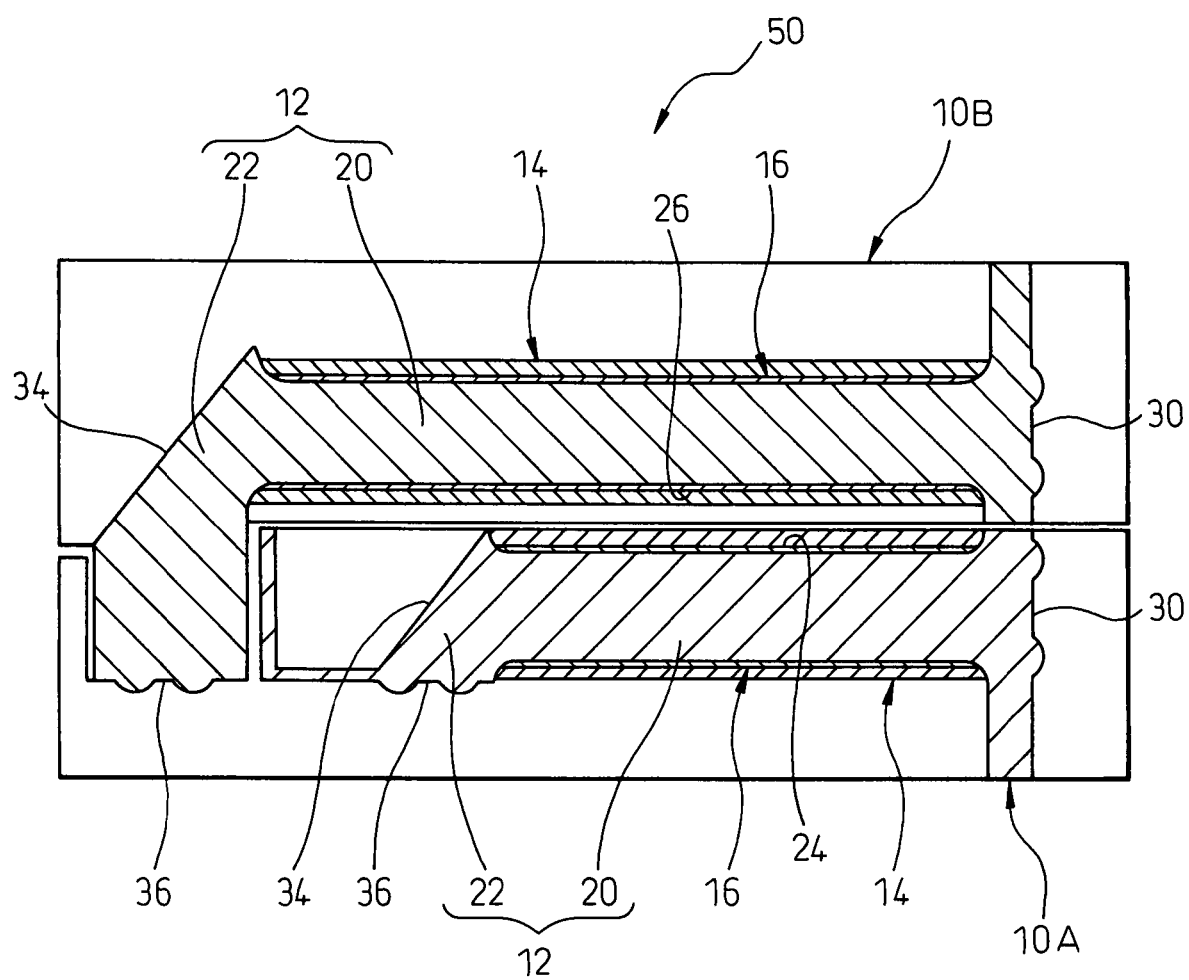
FIG. 5 is a vertical sectional view, corresponding to FIG. 3, of an optical waveguide assembly according to an embodiment of the present invention.

A plurality of optical waveguide members 10, each having above-described configuration, can be assembled, so as to easily accommodate increased number of channels for further multi-channel structure. FIG. 5 is a view showing an optical waveguide assembly 50, according to an embodiment of the present invention, which includes two optical waveguide members 10. The two optical waveguide members 10 of the optical waveguide assembly 50 include a lower member 10A in which the dimension of the major portion 20 and the auxiliary portion 22 of the first cladding section 12 is relatively small, and an upper member 10B in which the dimension of the major portion 20 and the auxiliary portion 22 is relatively large. Except for the difference in the dimension, two optical waveguide members 10A, 10B have substantially the same configuration as the optical waveguide members 10 described above with reference to FIGS. 1 to 4D. Therefore, corresponding components are denoted by common reference numerals, and explanations thereof are not repeated.

The optical waveguide assembly 50 is configured by combining two optical waveguide members 10A, 10B in a stacked state, with the first surface 24 of the major portion 20 of the first cladding section 12 of the lower optical waveguide member 10A facing to the second surface 26 of the major portion 20 of the first cladding section 12 of the upper optical waveguide member 10B. As shown in the drawing, by fabricating each of the optical waveguide members 10A, 10B such that the first surface 24 of the lower optical waveguide member 10A and the second surface 26 of the upper optical waveguide member 10B can be positioned as near as possible, an increase in the overall dimension in the height direction can be suppressed to some extent. If the optical waveguide assembly 50 having such configuration is incorporated in an optical module, the optical module having more channels (48 channels in the embodiment shown) can be realized while keeping the dimensional increase to a minimum.

Figure 6:
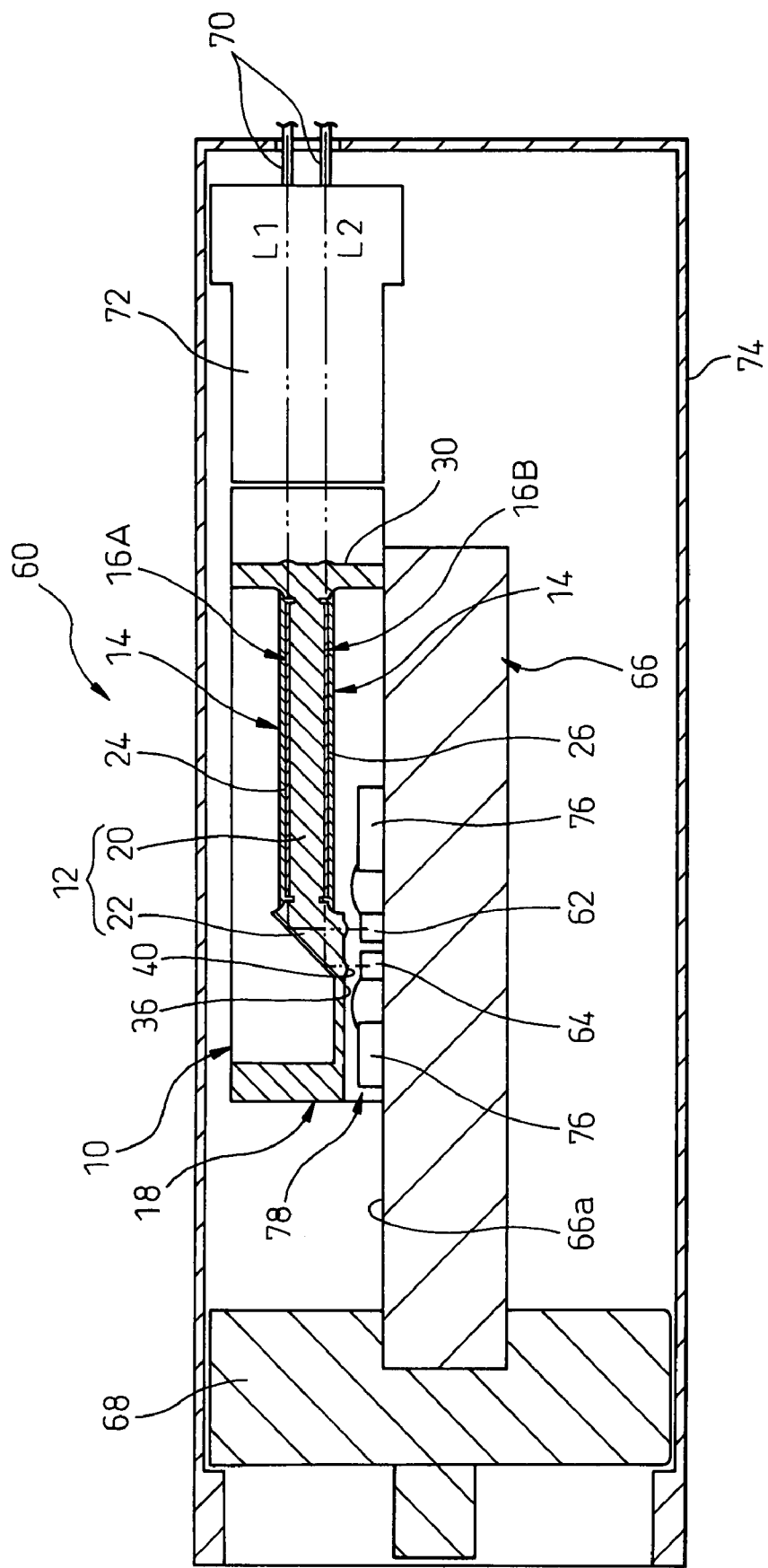
FIG. 6 is a vertical sectional view, corresponding to FIG. 3, of an optical module according to an embodiment of the present invention.

FIG. 6 is a view showing an optical module 60, according to an embodiment of the present invention, which includes the optical waveguide member 10, as shown in FIGS. 1 to 4D, incorporated therein. The optical module 60 includes a circuit board 66 having a mounting surface 66a with a plurality of optical elements 62, 64 mounted thereon, and the optical waveguide member 10 provided on the mounting surface 66a of the circuit board 66 and configured to direct the light L1, L2, participating in a photoelectric converting action (i.e., an emission of light and a reception of light) of the optical elements 62, 64, in a direction parallel to the mounting surface 66a. The optical module 60 further includes an electrical connector 68 provided on the circuit board 66 for releasably connected to an external electric circuit (not shown) sending and receiving electric signals to and from individual optical elements 62, 64, an optical connector 72 attached to an external optical cable 70, which sends and receives optical signals to and from individual optical elements 62, 64 and releasably connected to the optical waveguide member 10, and a module case 74 for accommodating the circuit board 66, the optical waveguide member 10, the electrical connector 68 and the optical connector 72.

The optical waveguide member 10 incorporated in the optical module 60 is disposed at a predetermined position on the mounting surface 66a such that the second end face 36 of the auxiliary portion 22 of the first cladding section 12 is disposed proximately to and faces toward the optical elements 62, 64 mounted on the circuit board 66. The plurality of optical elements 62, 64 include a first set of optical elements 62 and a second set of optical elements 64 in alignment (in a direction perpendicular to the plane of the drawing sheet) on the mounting surface 66a of the circuit board 66. The optical waveguide member 10 is configured such that the light L1 propagating through the first set of core sections 16A acts on the first set of optical elements 62 through the lens surfaces 40 provided on the second end face 36 of the first cladding section 12, and the light L2 propagating through the second set of core sections 16B acts on the second set of optical elements 64 through the lens surfaces 40 provided on the second end face 36 of the first cladding section 12.

The optical module 60 having the above-described configuration can effectively reduce the dimension, especially in a height direction (a direction perpendicular to the mounting surface 66a of the circuit board 66), of the optical connector 74, since the optical waveguide member 10 can direct the light, acting on (or emitted or received by) the optical elements 62, 64 mounted on the circuit board 66 in the direction perpendicular to the mounting surface 66a, to the direction parallel to the mounting surface 66a, and also can form a releasable optical connection to the optical connector 72 attached to the optical cable 70. By using the optical waveguide member 10 having the above-described operative effect, a multi-channel photoelectric conversion system, having more than 10 channels, can be established while restraining an increase in the overall dimensions. In this photoelectric conversion system, the existing optical connector 72 capable of collectively connecting two flat multi-core optical cables 70 can be used, which has a significant advantage in cost.

In the optical module 60, from among a plurality of optical elements 62, 64, each of the first set of optical elements 62 can be configured as a light emitting element such as a semiconductor laser, and each of the second set of optical elements 64 can be configured as a light receiving element such as an optical sensor. In this arrangement, the first set of core sections 16A formed on the first surface 24 of the major portion 20 of the first cladding section 12 of the optical waveguide member 10 respectively propagate the light L1 emitted by the plurality of light emitting elements 62, and the second set of core sections 16B formed on the second surface 26 of the major portion 20 of the first cladding section 12 of the optical waveguide member 10 respectively propagate the light L2 received by the plurality of light receiving elements 64. Thus, the optical module 60 as a single unit can be used for both the purposes of sending and receiving a light signal.

In the above configuration, it is preferable that the plurality of light emitting elements 62 constituting the first set of optical elements 62 are disposed, on the mounting surface 66a of the circuit board 66, at positions nearer, to the first end face 30 of the major portion 20 of the first cladding section 12 of the optical waveguide member 10 (i.e., nearer to the optical connector 72), than the plurality of light receiving elements 64 constituting the second set of optical elements 64. With this configuration, the light receiving elements 64 are disposed at positions farther from the core sections 16 as light propagating paths, so that it is possible to effectively reduce noise affecting the light receiving elements 64.

As shown in the drawing, the optical waveguide member 10 is preferably configured such that the pedestal section 18 creates a gap 78 for accommodating not only the optical elements 62, 64 but also respective driving elements (e.g., integrated circuits) 76 for the optical elements 62, 64, between the second surface 26 of the major portion 20 of the first cladding section 12 and the mounting surface 66a of the circuit board 66. For this purpose, the optical waveguide member 10 has a difference in height between the bottom face 18a of the pedestal section 18 and the second surface 26 of the first cladding section 12 sufficient for accommodating the driving elements 76 (see FIGS. 3 and 4D). With this configuration, it is possible to effectively suppress an increase in the dimensions of the circuit board 66.

Further, as shown in FIG. 6, in the optical module 60, the dimension in the height direction of the optical waveguide member 10 can be matched to the dimension in the height direction of the existing flat optical connector 72, so that an idle space in the module case 74 can be reduced as much as possible. In this arrangement, if a region for placing the optical connector 72 is provided on the mounting surface 66a of the circuit board 66, the stability of optical connection using the optical connector 72 can be improved. In the optical module 60, an optical waveguide assembly 50 shown in FIG. 5 may be used in place of the optical waveguide member 10.

Figure 7A:
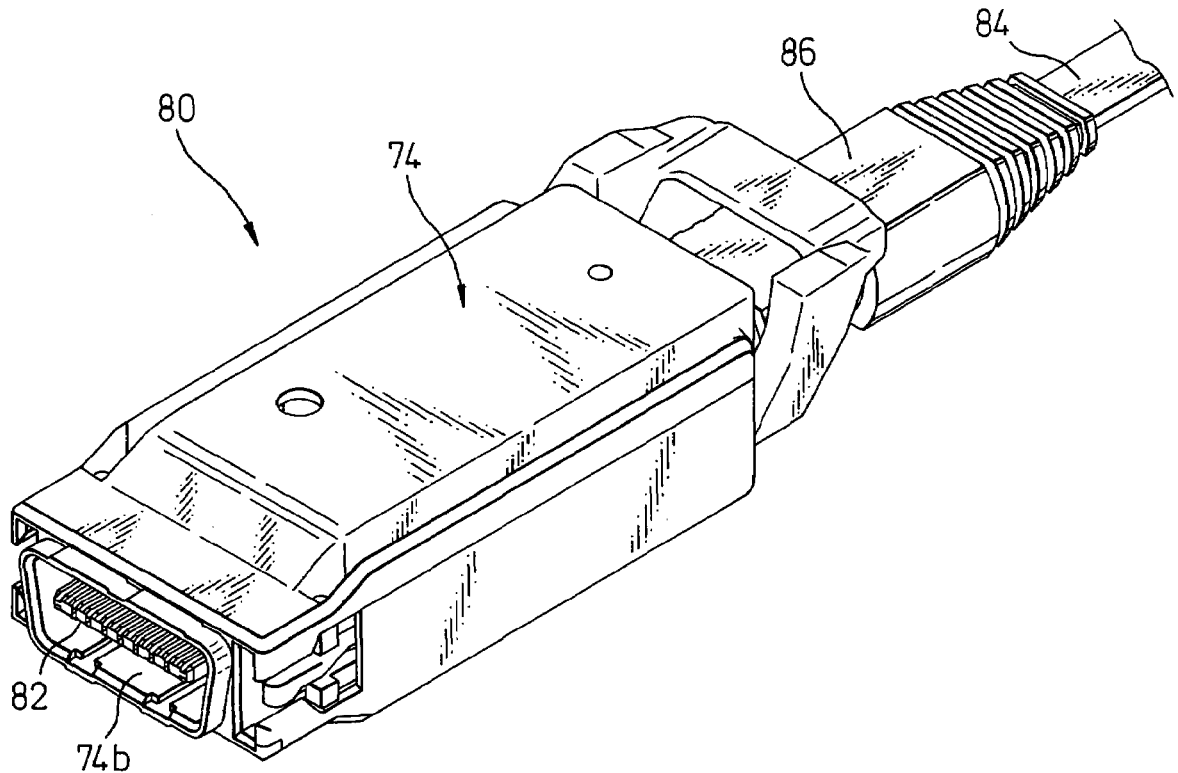
FIG. 7A is a perspective view showing an entire configuration of an optical module according to another embodiment of the present invention.
Figure 7B:
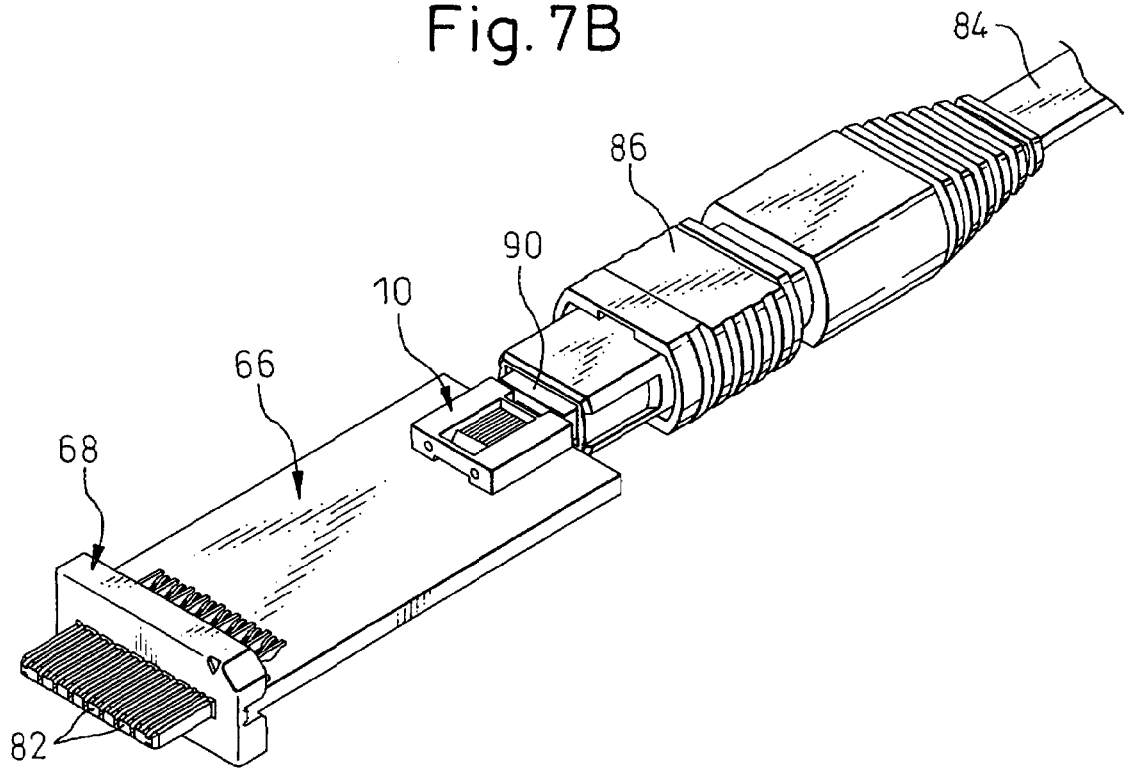
FIG. 7B is a perspective view showing an internal structure of the optical module of FIG. 7A.

FIGS. 7A, 7B and 8 are views showing an optical module 80 according to another embodiment of the present invention. The optical module 80 is embodied from the above-described optical module 60 to a feasible level, and has a basic configuration substantially identical to that of the optical module 60. Therefore, corresponding components are denoted by common reference numerals, and explanations thereof are not repeated.

The optical module 80 has a configuration in which a circuit board 66, on which an optical waveguide member 10 and an electrical connector 68 are mounted, is built into a module case 74. The module case 74 is a tubular member having openings 74a, 74b at longitudinally opposite ends, and the circuit board 66 is fixed in the internal space of the module case 74 with the optical waveguide member 10 adjoining the opening 74a at one end and the electrical connector 68 adjoining the opening 74b at the other end. In this state, a plurality of lens surfaces 38 disposed on the first end face 30 of the optical waveguide 10 in two rows of array (FIGS. 4B and 4C) can be easily accessed through the opening 74a of the module case 74. Also, a plurality of contact elements 82 of the electrical connector 68 can be easily accessed through the opening 74b of the module case 74.

Figure 9A:
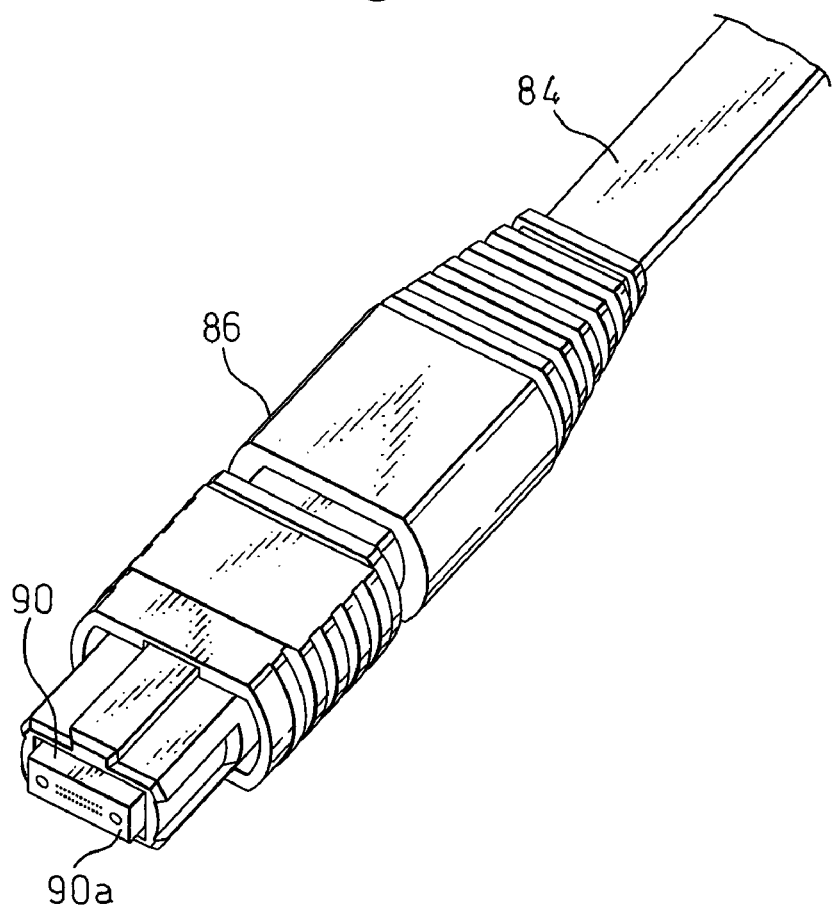
FIG. 9A is a perspective view showing an entire configuration of an optical connector capable of being connected to the optical module of FIG. 7A.
Figure 9B:
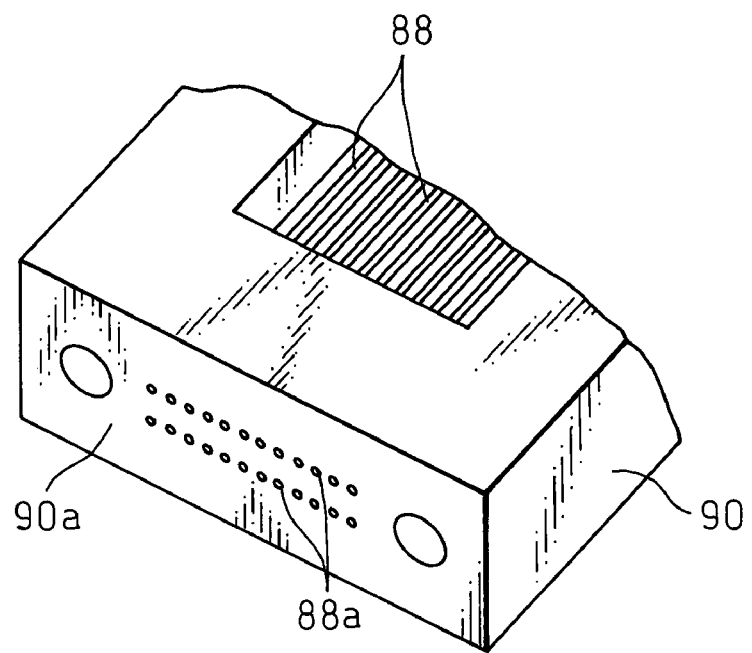
FIG. 9B is an enlarged view showing an essential part of the optical connector of FIG. 9A.

An optical connector 86 attached to a distal end of an optical cable 84 is adapted to be detachably attached to the optical module 80. The optical connector 86 includes, as shown in FIGS. 9A and 9B, a fiber support member 90 for fixedly supporting a plurality of optical fibers 88 (FIG. 9B) in a two-row multi-column matrix arrangement (individual fiber end faces 88a are shown), and the fiber support member 90 is attached to the flat optical cable 84 incorporating the optical fibers in corresponding arrangement.

The optical connector 86 is detachably attached to the module case 74 in a state where an end face 90a of the fiber support member 90, on which the plurality of fiber end faces 88a are exposed, is properly positioned to face toward the first end face 30 of the optical waveguide member 10 having the plurality of lens surfaces 38 arranged in a two-row array (FIGS. 4B and 4C) through the opening 74a of the module case 74 (FIG. 8). In this state, the fiber end faces 88a provided on the optical connector 86 are accurately aligned with and individually centered to the lens surface 38 of the optical waveguide member 10, whereby the optical fibers 88 in the optical connector 86 are individually and optically connected to the core sections 16 of the optical waveguide member 10. Thus, the optical fibers 88 of the multi-core optical cable 84 are optically connected to the optical elements 62, 64 mounted on the circuit board 66 through the optical connector 86 and the optical waveguide member 10 (FIG. 6).

The electrical connector 68 is mounted on the outer peripheral region of the circuit board 66 in a state where the contact elements 82 are individually connected to a plurality of conductor terminals (not shown) formed on both of opposite surfaces of the circuit board 66. Thereby, the electrical connector 68 is electrically connected to the optical elements 62, 64 (FIG. 6) through a plurality of conductors (not shown) of the circuit board 66. The optical module 80 is connected to an external electrical circuit (not shown) through the electrical connector 68 while being connected to the optical cable 84 through the optical connector 86. The optical module 80 having the above configuration possesses remarkable effects equivalent to those of the optical module 60 as described above.

Figure 10A:
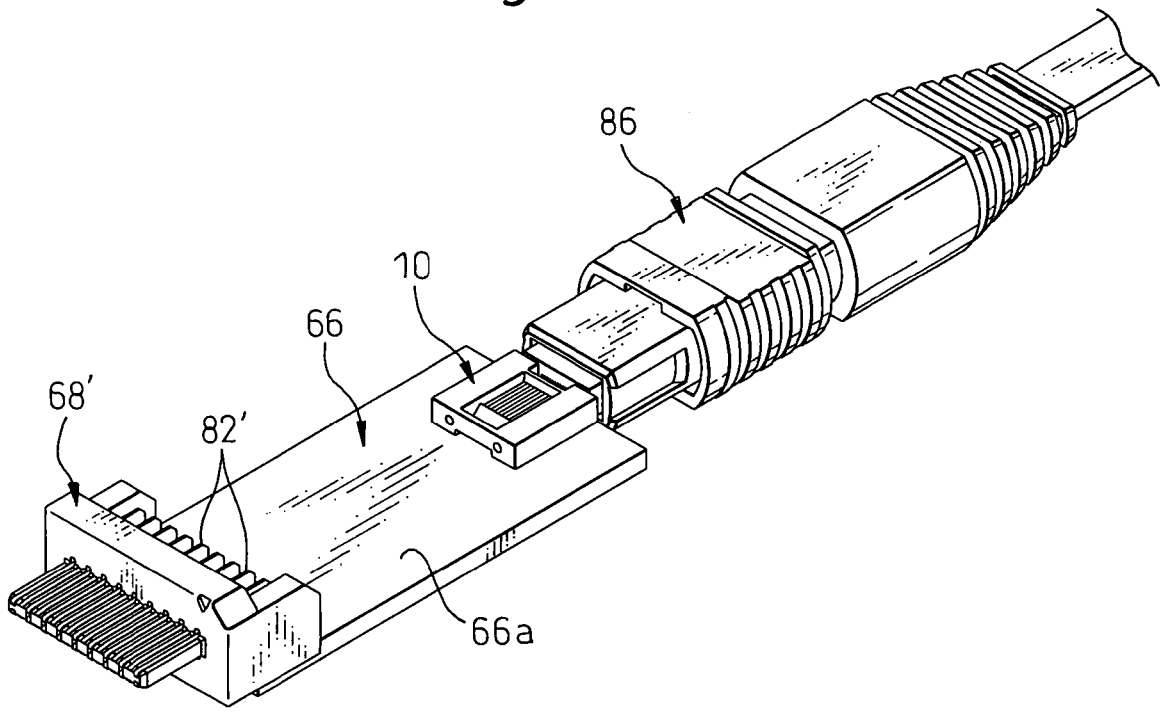
FIG. 10A is a view showing a first modification of the internal structure of the optical module of FIG. 7A.
Figure 10B:
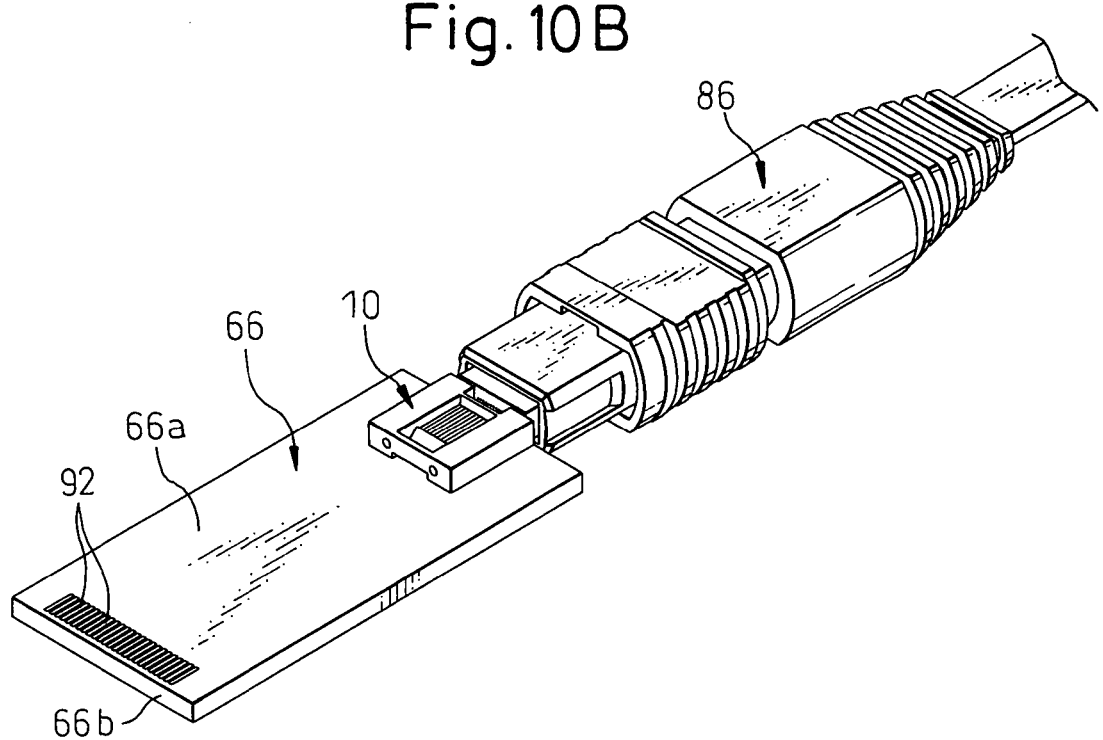
FIG. 10B is a view showing a second modification of the internal structure of the optical module of FIG. 7A.

The optical module 80 described above can employ a connecting structure other than the above-described electrical connector 68 as a connecting structure for connection of the circuit board 66 to an external electric circuit. For example, as shown in FIG. 10A, an electrical connector 68' having a plurality of right-angle contact elements 82' individually connected to a plurality of conductors (not shown) formed on one surface (or a mounting surface 66a) of the circuit board 66 can be employed and mounted to the outer peripheral region of the circuit board 66. Alternatively, as shown in FIG. 10B, without using an electrical connector, a plurality of terminals 92 provided along the peripheral edge 66b of the circuit board 66 and individually connected to the optical elements 62, 64 (FIG. 6) on the circuit board 66 can be used as a connecting structure to an external electric circuit.

As described above, the optical waveguide member 10 according to the first embodiment of the present invention is configured such that both of the light L1 and light L2, propagating respectively through the core sections 16A, 16B formed on the first and second surface 24, 26 of the major portion 20 of the first cladding section 12, are reflected by the reflecting surface 34 and thereby propagate through the auxiliary portion 22 of the first cladding section 12 (FIG. 3). Thus, for example, each light L1, L2 exiting from the core end face of each of the core sections 16A, 16B, facing to the reflecting surface 34, propagates through the auxiliary portion 22 for a relatively long distance with the divergence thereof being not substantially restricted, until it reaches each of the lens surfaces 40 formed at the second end face 36 of the auxiliary portion 22. As a result, each light L1, L2 exiting each core section 16A, 16B toward the reflecting surface 34 gradually diverges, so that, when the light reaches the second end face 36, neighboring light beams may interfere with each other to cause noise in the transmitted signal.

Figure 11A:
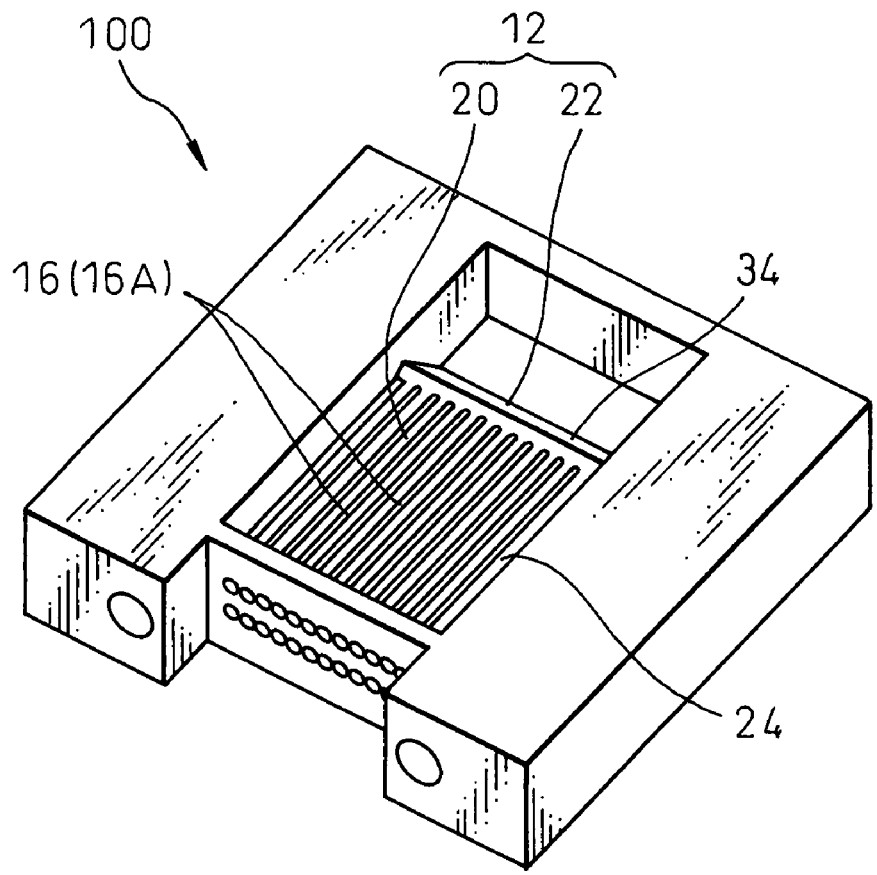
FIG. 11A is a perspective view showing an entire configuration of an optical waveguide member according to a second embodiment of the present invention.
Figure 11B:
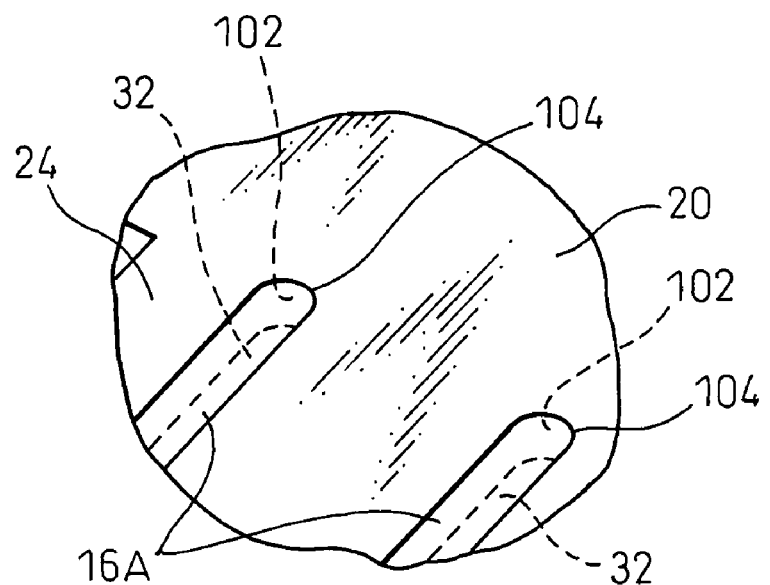
FIG. 11B is an enlarged view showing an essential part of the optical waveguide member of FIG. 11A.
Figure 12:
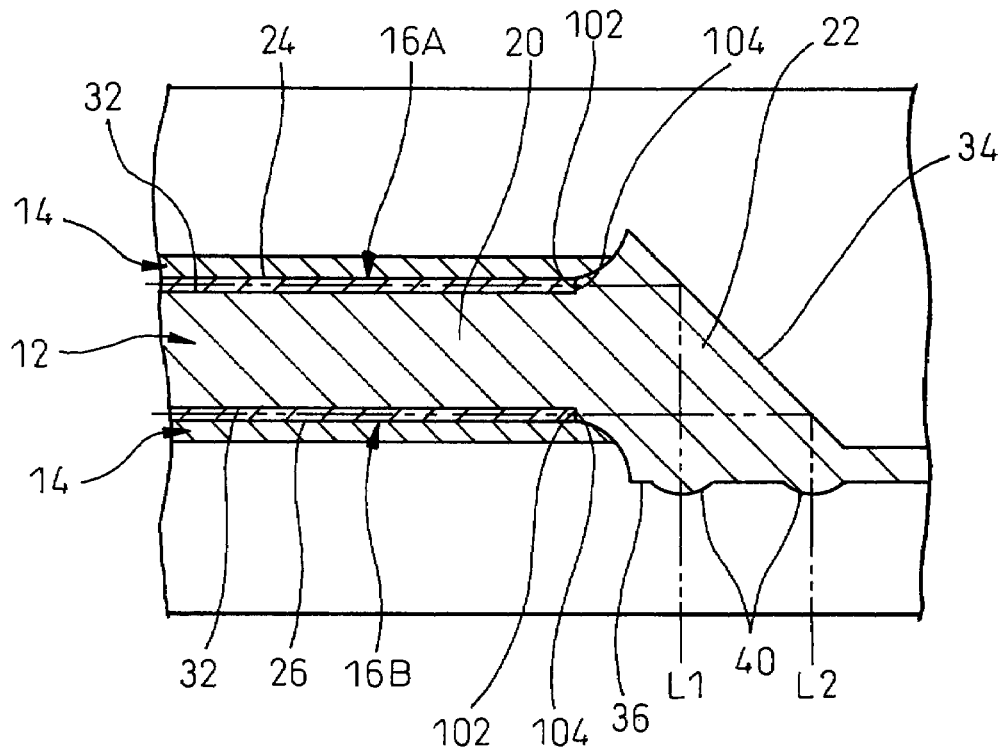
FIG. 12 is a vertical sectional view, corresponding to FIG. 3, of the optical waveguide member of FIG. 11A.

FIGS. 11A, 11B and 12 are views showing an optical waveguide member 100 according to a second embodiment of the present invention, which is capable of avoiding the above-described inconveniences. The optical waveguide member 100 according to the second embodiment has a basic configuration substantially identical to that of the optical waveguide member 10 according to the first embodiment, except for the configuration of the core end faces of respective core sections 16A, 16B. Therefore, corresponding components are denoted by common reference numerals, and explanations thereof are not repeated.

In the optical waveguide member 100, each of the plurality of grooves 32 provided on the first and second surfaces 24, 26 of the major portion 20 of the first cladding section 12 is provided, at a longitudinal end thereof facing to the reflecting surface 34 of the auxiliary portion 22, with a curved end face 102 arcuately bulging toward the reflecting surface 34. On the other hand, each of the core sections 16A, 16B formed in the respective grooves 32 is provided, at a longitudinal end thereof facing to the reflecting surface 34 of the auxiliary portion 22, with a core end face 104 acting as a convex lens relative to the light L1, L2 propagating through each core section 16A, 16B, which is formed in correspondence to the curved end faces 102.

Figure 13:
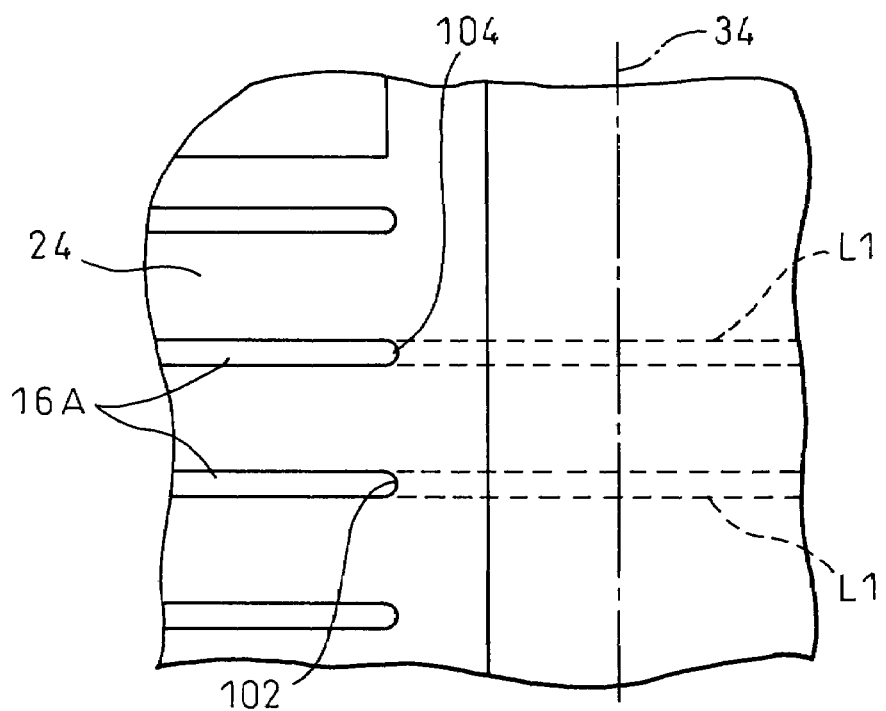
FIG. 13 is a schematic plan view useful for explaining the mode of light propagation in the optical waveguide member of FIG. 11A.

With the optical waveguide member 100 having the above configuration, as the core end faces 104 act as convex lenses, the divergence of the light L1, L2 exiting the core end faces 104 of respective core sections 16A, 16B, facing to the reflecting surface 34, is effectively suppressed, and therefore the light L1, L2 preferably propagate through the auxiliary portion 22 as substantially parallel beams (see FIG. 13). Thus, the respective light L1, L2 exiting the respective core sections 16A, 16B toward the reflecting surface 34 can propagate as substantially parallel beams, and reach the respective lens surfaces 40 formed at the second end face 36 of the auxiliary portion 22 without producing interference between the neighboring light beams. As a result, noise of transmitted signal can be effectively eliminated. Suppression effect on the divergence of the light L1, L2 exiting the core end faces 104 can be adjusted by suitably selecting the curvature of the core end faces 104 of respective core sections 16A, 16B.

In the above-described configuration, in the case where the plurality of grooves 32 provided on the first and second surfaces 24, 26 of the major portion 20 of the first cladding section 12 are formed in a die molding process as already described, in view of a mold removing step, the curved end face 102 of each groove 32 is to be formed as two-dimensional curved surface, which is not curved in the direction of a groove depth, as shown in FIG. 11B. With the core end faces 104 of respective core sections 16A, 16B formed in correspondence to the two-dimensional curved end faces 102, it is possible to suppress the divergence of light in a transverse direction parallel to the first and second surfaces 24, 26 of the major portion 20, as can be seen in FIGS. 12 and 13, but it is difficult to suppress the divergence of light in a vertical direction perpendicular to the first and second surfaces 24, 26 of the major portion 20. However, as shown in FIG. 2, for example, the separation between the neighboring lens surfaces 40 on the second end face 36 of the auxiliary portion 22 is significantly smaller in the transverse direction parallel to the first and second surfaces 24, 26 of the major portion 20 than in the vertical direction perpendicular to the first and second surfaces 24, 26 of the major portion 20. Therefore, even when the core end faces 104 of respective core sections 16A, 16B are formed as the two-dimensional curved surface as shown in the drawing, the interference between the light L1, L2 exiting the core sections 16A, 16B toward the reflecting surface 34 can be reliably prevented and noise in transmitted signal can be effectively eliminated.

The present invention has been described above with reference to some preferred embodiments. However, the present invention is not limited to the embodiments described above, but can be implemented in various modifications. For example, the core sections of the optical waveguide member can have various structures depending upon required applications (an optical switch, a photo-coupler, etc.). Various functional elements (e.g., a locating hole 106 (FIG. 1), etc.) effective in an optical connection can be integrally provided to the optical waveguide member, and thereby the number of parts for constructing the optical system and the cost of configuration can be reduced. Fabricating methods of the optical waveguide member are not limited to a die molding process, and machine processing such as cutting, etc. can also be employed.

In each of the optical waveguide members 10, 100 according to the embodiments shown, the first cladding section 12 and the second cladding section 14 are fabricated from the same resin material and joined to each other. Therefore, as an external appearance of an article, the optical waveguide member can be regarded to include only one cladding section. From this viewpoint, the characteristic configuration of the inventive optical waveguide member can be expressed as follows: an optical waveguide member including a cladding section (12, 14) and a plurality of core sections (16) formed in the cladding section; wherein the cladding section includes a major portion (20) including a plurality of first grooves (32) arranged in a first row of array and a plurality of second grooves (32) arranged in a second row of array and spaced in parallel from the first row of array, and an auxiliary portion (22) formed adjacent to the major portion and including a reflecting surface (34) extending in a direction obliquely intersecting the extending direction of the plurality of first and second grooves of the major portion; wherein the plurality of core sections include a first set of core sections (16A) formed in the plurality of first grooves of the major portion of the cladding section and a second set of core sections (16B) formed in the plurality of second grooves of the major portion of the cladding section; and wherein both of the light (L1) propagating through the first set of core sections and the light (L2) propagating through the second set of core sections are reflected by the reflecting surface and propagate through the auxiliary portion of the cladding section.

In this arrangement, the major portion of the cladding section may be configured to be provided, at a side opposite to the auxiliary portion, with a first end face (30) extending in a direction intersecting the extending direction of the plurality of first and second grooves; and a plurality of lens surfaces (38) are formed on the first end face to individually transmit the light propagating through the first set of core sections and the light propagating through the second set of core sections. The auxiliary portion of the cladding section may be configured to be provided, at a side opposite to the major portion, with a second end face (36) extending in a direction obliquely intersecting the reflecting surface; and a plurality of lens surfaces (40) are formed on the second end face to individually transmit the light propagating through the first set of core sections and the light propagating through the second set of core sections. Further, each of the plurality of first and second grooves may be configured to be provided, at a longitudinal end thereof facing to the reflecting surface of the auxiliary portion, with a curved end face (102) arcuately bulging toward the reflecting surface; and a core end face (104) acting as a convex lens relative to the light propagating through each of the plurality of core sections is formed along the curved end face at a longitudinal end of each core section.

While the invention has been described with reference to specific preferred embodiments, it will be understood, by those skilled in the art, that various changes and modifications may be made thereto without departing from the scope of the following claims.

The invention claimed is:

1. An optical waveguide member comprising:
   a first cladding section;
   a second cladding section joined to said first cladding section; and
   a plurality of core sections formed between said first cladding section and said second cladding section;
   said first cladding section comprising:
   a major portion including a first surface, a second surface opposite to and in a different plane than said first surface, a first end face extending in a direction perpendicular to both of said first surface and said second surface, and a plurality of grooves provided respectively on said first surface and said second surface to extend in a direction perpendicular to said first end face; and
   an auxiliary portion integrally connected to said major portion at a side opposite to said first end face, said auxiliary portion including a reflecting surface extending in a direction obliquely intersecting both of said first surface and said second surface of said major portion, and a second end face extending in a direction obliquely intersecting said reflecting surface and perpendicular to said first end face of said major portion;
   said plurality of core sections comprising:
   a first set of core sections formed along said plurality of grooves provided on said first surface of said major portion of said first cladding section; and
   a second set of core sections formed along said plurality of grooves provided on said second surface of said major portion of said first cladding section;
   said second cladding section being configured to cover said first set of core sections and said second set of core sections formed respectively on said first surface and said second surface of said major portion of said first cladding section, and to be joined to said first and second surface;
   wherein light propagating through said first set of core sections formed on said first surface of said major portion of said first cladding section and light propagating through said second set of core sections formed on said second surface of said major portion of said first cladding section are reflected by said reflecting surface and propagate through said auxiliary portion of said first cladding section.

2. An optical waveguide member as set forth in claim 1, wherein a plurality of lens surfaces are formed on said first end face of said major portion of said first cladding section, said lens surfaces being disposed at positions where the light propagating through said first set of core sections formed on said first surface and the light propagating through said second set of core sections formed on said second surface are individually transmitted said lens surfaces.

3. An optical waveguide member as set forth in claim 1, wherein a plurality of lens surfaces are formed on said second end face of said auxiliary portion of said first cladding section, said lens surfaces being disposed at positions where the light propagating through said first set of core sections formed on said first surface and reflected by said reflecting surface and the light propagating through said second set of core sections formed on said second surface and reflected by said reflecting surface are individually transmitted said lens surfaces.

4. An optical waveguide member as set forth in claim 1, wherein said first set of core sections formed on said first surface of said major portion of said first cladding section and said second set of core sections formed on said second surface of said major portion of said first cladding section are disposed at positions enabling the light propagating through said first set of core sections to cross the light propagating through said second set of core sections and thus to propagate through said auxiliary portion of said first cladding section.

5. An optical waveguide member as set forth in claim 1, wherein each of said plurality of grooves provided on said first and second surfaces of said major portion of said first cladding section is provided, at a longitudinal end thereof facing to said reflecting surface of said auxiliary portion, with a curved end face arcuately bulging toward said reflecting surface;
and wherein a core end face acting as a convex lens relative to light propagating through each of said plurality of core sections is formed along said curved end face at a longitudinal end of each core section.

6. An optical waveguide assembly comprising:
a plurality of optical waveguide members, each optical waveguide member being one as set forth in claim 1;
wherein said optical waveguide members are assembled together in a stacked form with said first surface of said major portion of one optical waveguide member facing to said second surface of said major portion of another optical waveguide member.

7. An optical module comprising:
a circuit board having a mounting surface with a plurality of optical elements mounted thereon; and
an optical waveguide member provided on said mounting surface of said circuit board and configured to direct light, participating in a photoelectric converting action of each of said plurality of optical elements, in a direction parallel to said mounting surface;
wherein said optical waveguide member is one as set forth in claim 1; and
wherein said second end face of said auxiliary portion of said first cladding section is disposed proximately to, and faces toward, said plurality of optical elements mounted on said circuit board.

8. An optical module as set forth in claim 7, wherein said plurality of optical elements comprise a plurality of light emitting elements and a plurality of light receiving elements; wherein said first set of core sections formed on said first surface of said major portion of said first cladding section of said optical waveguide member propagate light emitted respectively by said plurality of light emitting elements; and wherein said second set of core sections formed on said second surface of said major portion of said first cladding section of said optical waveguide member propagate light received respectively by said plurality of light receiving elements.

9. An optical module as set forth in claim 8, wherein said plurality of light emitting elements are disposed, on said mounting surface of said circuit board, at positions nearer, to said first end face of said major portion of said first cladding section of said optical waveguide member, than said plurality of light receiving elements.

10. An optical module as set forth in claim 7, wherein said optical waveguide member further comprises a pedestal section creating a gap, for accommodating said optical elements and driving elements for said optical elements, between said second surface of said major portion of said first cladding section and said mounting surface of said circuit board.

11. An optical module as set forth in claim 7, further comprising an electrical connector mounted on said circuit board and connected to said plurality of optical elements on said circuit board.

12. An optical module as set forth in claim 7, further comprising a plurality of terminals provided along a peripheral edge of said circuit board and individually connected to said plurality of optical elements on said circuit board.

13. An optical module as set forth in claim 7, wherein said optical waveguide member is connected to an optical connector provided with a plurality of optical fibers, said plurality of optical fibers of said optical connector being individually connected optically to said plurality of core sections.

14. An optical waveguide member comprising:
a cladding section; and
a plurality of core sections formed in said cladding section;
said cladding section comprising:
a major portion including a plurality of first grooves arranged in a first array and a plurality of second grooves arranged in a second array, the second array being in a different plane spaced and parallel relative to said first array; and
an auxiliary portion formed adjacent to said major portion, and including a reflecting surface extending in a direction obliquely intersecting an extending direction of said plurality of first and second grooves of said major portion;
said plurality of core sections comprising:
a first set of core sections formed in said plurality of first grooves of said major portion of said cladding section; and
a second set of core sections formed in said plurality of second grooves of said major portion of said cladding section;
wherein light propagating through said first set of core sections and light propagating through said second set of core sections are reflected by said reflecting surface and propagate through said auxiliary portion of said cladding section.

15. An optical waveguide member as set forth in claim 14, wherein said major portion of said cladding section is provided, at a side opposite to said auxiliary portion, with a first end face extending in a direction intersecting said extending direction of said plurality of first and said second grooves; and wherein a plurality of lens surfaces are formed on said first end face to individually transmit light propagating through said first set of core sections and light propagating through said second set of core sections.

16. An optical waveguide member as set forth in claim 14, wherein said auxiliary portion of said cladding section is provided, at a side opposite to said major portion, with a second end face extending in a direction obliquely intersecting said reflecting surface; and wherein a plurality of lens surfaces are formed on said second end face to individually transmit light propagating through said first set of core sections and light propagating through said second set of core sections.

17. An optical waveguide member as set forth in claim 14, wherein each of said plurality of first and second grooves of said major portion of said cladding section is provided, at a longitudinal end thereof facing to said reflecting surface of said auxiliary portion, with a curved end face arcuately bulging toward said reflecting surface; and wherein a core end face acting as a convex lens relative to light propagating through each of said plurality of core sections is formed along said curved end face at a longitudinal end of each core section.

18. An optical waveguide member comprising:
a plurality of core sections formed in a cladding section;
the cladding section comprising:
a major portion including a plurality of grooves provided respectively on a first surface and a second surface that is opposite to and in a different plane than the first surface; and
an auxiliary portion, connected to the major portion, including a reflecting surface;
the plurality of core sections comprising:
a first set of core sections formed along the plurality of grooves provided on the first surface of the major portion; and
a second set of core sections formed along the plurality of grooves provided on the second surface of the major portion;
wherein light propagating through the first set of core sections and light propagating through said second set of core sections formed are reflected by the reflecting surface and propagate through said auxiliary portion.

* * * * *